(12) United States Patent
Zhang et al.

(10) Patent No.: US 12,474,799 B2
(45) Date of Patent: Nov. 18, 2025

(54) TOUCH DISPLAY PANEL AND DISPLAY APPARATUS

(71) Applicants: Chengdu BOE Optoelectronics Technology Co., Ltd., Sichuan (CN); BOE Technology Group Co., Ltd., Beijing (CN)

(72) Inventors: Guiyu Zhang, Beijing (CN); Jun Yan, Beijing (CN); Hang Min, Beijing (CN); Ping Luo, Beijing (CN); Zhiqiang Wang, Beijing (CN)

(73) Assignees: Chengdu BOE Optoelectronics Technology Co., Ltd., Sichuan (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/688,002

(22) PCT Filed: Sep. 29, 2022

(86) PCT No.: PCT/CN2022/122675
§ 371 (c)(1),
(2) Date: Feb. 29, 2024

(87) PCT Pub. No.: WO2024/065411
PCT Pub. Date: Apr. 4, 2024

(65) Prior Publication Data
US 2025/0123703 A1    Apr. 17, 2025

(51) Int. Cl.
G06F 3/041    (2006.01)
G06F 3/044    (2006.01)

(52) U.S. Cl.
CPC ........ *G06F 3/04164* (2019.05); *G06F 3/0442* (2019.05); *G06F 2203/04102* (2013.01); *G06F 2203/04107* (2013.01)

(58) Field of Classification Search
CPC .................................................. G06F 3/04164
See application file for complete search history.

(56) References Cited

U.S. PATENT DOCUMENTS

2020/0257429 A1* 8/2020 Hisano ................ G06F 3/04182
2022/0084991 A1* 3/2022 Ikeda ................... H10H 20/855
(Continued)

FOREIGN PATENT DOCUMENTS

CN    109976056    *    4/2019    .......... G02F 1/1362
CN    109976056 A        7/2019
(Continued)

*Primary Examiner* — Chun-Nan Lin
(74) *Attorney, Agent, or Firm* — HOUTTEMAN LAW LLC

(57) ABSTRACT

The embodiment of the present disclosure provides a touch display panel and a display apparatus. The touch display panel includes: a base substrate; a plurality of display signal lines on one side of the base substrate; a plurality of light-emitting devices in an array on a side of the plurality of display signal lines away from the base substrate; a touch structure on a side of the plurality of light-emitting devices away from the base substrate; and a shielding layer between the plurality of display signal lines and the plurality of light-emitting devices, wherein an orthographic projection of the shielding layer on the base substrate covers at least a part of an orthographic projection of the plurality of display signal lines on the base substrate.

16 Claims, 14 Drawing Sheets

(56) References Cited

U.S. PATENT DOCUMENTS

2023/0380225 A1* 11/2023 An .................. G06F 3/04164
2024/0077772 A1*  3/2024 Wada ................ G02F 1/1351

FOREIGN PATENT DOCUMENTS

| CN | 112420799 A | 2/2021 |
| CN | 113555399 A | 10/2021 |
| CN | 113964109 A | 1/2022 |
| CN | 114072724 A | 2/2022 |
| CN | 114115574 A | 3/2022 |
| CN | 114185454 A | 3/2022 |
| WO | WO 2022041237 A1 | 3/2022 |

* cited by examiner

TOUCH DISPLAY PANEL AND DISPLAY APPARATUS

TECHNICAL FIELD

The present disclosure relates to the field of touch display technology, and in particular to a touch display panel and a display apparatus.

BACKGROUND

With the continuous development of electronic products, an AMOLED (Active Matrix Organic Light-Emitting Diode) display apparatus may realize a full screen, a narrow bezel, a high resolution, rollable wearing, folding, and the like, and therefore, is widely applied. The technology of directly forming a touch structure (Flexible Multi-Layer On Cell, FMLOC) on an encapsulation layer of an OLED (Organic Light-Emitting Diode) touch display panel may form a lighter and thinner display apparatus, and may be applied to a folded and rollable OLED display apparatus.

SUMMARY

Embodiments of the present disclosure provide a touch display panel and a display apparatus, and the specific solutions are as follows.

The embodiments of the present disclosure provide a touch display panel, including: a base substrate; a plurality of display signal lines on one side of the base substrate; a plurality of light-emitting devices in an array on a side of the plurality of display signal lines away from the base substrate; a touch structure on a side of the plurality of light-emitting devices away from the base substrate; and a shielding layer between the plurality of display signal lines and the plurality of light-emitting devices, an orthographic projection of the shielding layer on the base substrate covers at least a part of an orthographic projection of the plurality of display signal lines on the base substrate.

In some implementations, in the touch display panel provided by the embodiments of the present disclosure, an orthographic projection of the plurality of display signal lines on the base substrate is within the orthographic projection of the shielding layer on the base substrate.

In some implementations, in the touch display panel provided by the embodiments of the present disclosure, the shielding layer is made of a conductive material, and is loaded with a constant voltage signal or is grounded.

In some implementations, in the touch display panel provided by the embodiments of the present disclosure, the shielding layer is made of Ti/Al/Ti, Cu or ITO.

In some implementations, in the touch display panel provided by the embodiment of the present disclosure, the touch display panel includes a display region and a frame region around the display region; the touch display panel further includes: a high voltage power line in the display region and extending to the frame region, and a low voltage power line in the frame region; and the touch display panel further includes a first conductive connection part and a second conductive connection part independent from each other in the frame region and in the same layer as the shielding layer; the first conductive connection part is electrically connected to the high voltage power line, and the second conductive connection part is electrically connected to the low voltage power line.

In some implementations, in the touch display panel provided by the embodiments of the present disclosure, the shielding layer has a mesh structure.

In some implementations, in the touch display panel provided by the embodiments of the present disclosure, the plurality of display signal lines include at least one of a data signal line, a scanning signal line, a reset signal line, and a light-emitting control signal line.

In some implementations, in the touch display panel provided by the embodiments of the present disclosure, the touch display panel further includes a gate electrode in the same layer as the light-emitting control signal line, and the orthographic projection of the shielding layer on the base substrate further covers an orthographic projection of the gate electrode on the base substrate.

In some implementations, in the touch display panel provided by the embodiments of the present disclosure, the data signal line is between the base substrate and the shielding layer, the scanning signal line and the reset signal line are in the same layer and located between the data signal line and the base substrate, and the light-emitting control signal line is between the scanning signal line and the base substrate.

In some implementations, in the touch display panel provided by the embodiments of the present disclosure, the touch display panel further includes: a first planarization layer between the data signal line and the scanning signal line, a second planarization layer between the data signal line and the shielding layer, and a third planarization layer between the shielding layer and the plurality of light-emitting devices; and a shape of the third planarization layer is the same as that of the second planarization layer.

In some implementations, in the touch display panel provided by the embodiments of the present disclosure, the touch display panel further includes: an encapsulation layer between the plurality of light-emitting devices and the touch structure, a polarizer on a side of the touch structure away from the base substrate, an optical adhesive on a side of the polarizer away from the base substrate, and a cover plate on a side of the optical adhesive away from the base substrate.

Accordingly, embodiments of the present disclosure further provide a touch display panel, including: a base substrate; a plurality of display signal lines on one side of the base substrate; a plurality of light-emitting devices in an array on a side of the plurality of display signal lines away from the base substrate; an encapsulation layer on a side of the plurality of light-emitting devices away from the base substrate; a touch structure on a side of the encapsulation layer away from the base substrate; and a shielding layer between the plurality of display signal lines and the touch structure, and an orthographic projection of the shielding layer on the base substrate covers at least a part of an orthographic projection of the plurality of display signal lines on the base substrate; the plurality of display signal lines include a first signal line and a second signal line, the first signal line is configured to input an alternating current signal, and the second signal line is configured to input a direct current signal; and an overlapping area between the orthographic projection of the shielding layer on the base substrate and an orthographic projection of the first signal line on the base substrate is greater than an overlapping area between the orthographic projection of the shielding layer on the base substrate and an orthographic projection of the second signal line on the base substrate.

In some implementations, in the touch display panel provided by the embodiment of the present disclosure, the first signal line includes at least one of a data signal line, a scanning signal line, a reset signal line, and a light-emitting control signal line, and the second signal line includes at least one of a high voltage power line, a low voltage power line, and an initialization signal line.

Embodiments of the present disclosure further provide a display apparatus, which includes the touch display panel provided by the embodiments of the present disclosure.

In some implementations, in the display apparatus provided by the embodiments of the present disclosure, the display apparatus further includes a flexible circuit board, the flexible circuit board includes at least one ground pad and at least one constant voltage pad, and the shield layer is at least electrically connected to two ground pads, or two constant voltage pads, or one ground pad and one constant voltage pad.

In some implementations, in the display apparatus provided by the embodiments of the present disclosure, the display apparatus further includes an active stylus.

BRIEF DESCRIPTION OF DRAWINGS

FIG. 3 is a schematic diagram showing signal waveforms of data signal lines, a cathode and the like;

DETAIL DESCRIPTION OF EMBODIMENTS

Figure 1:
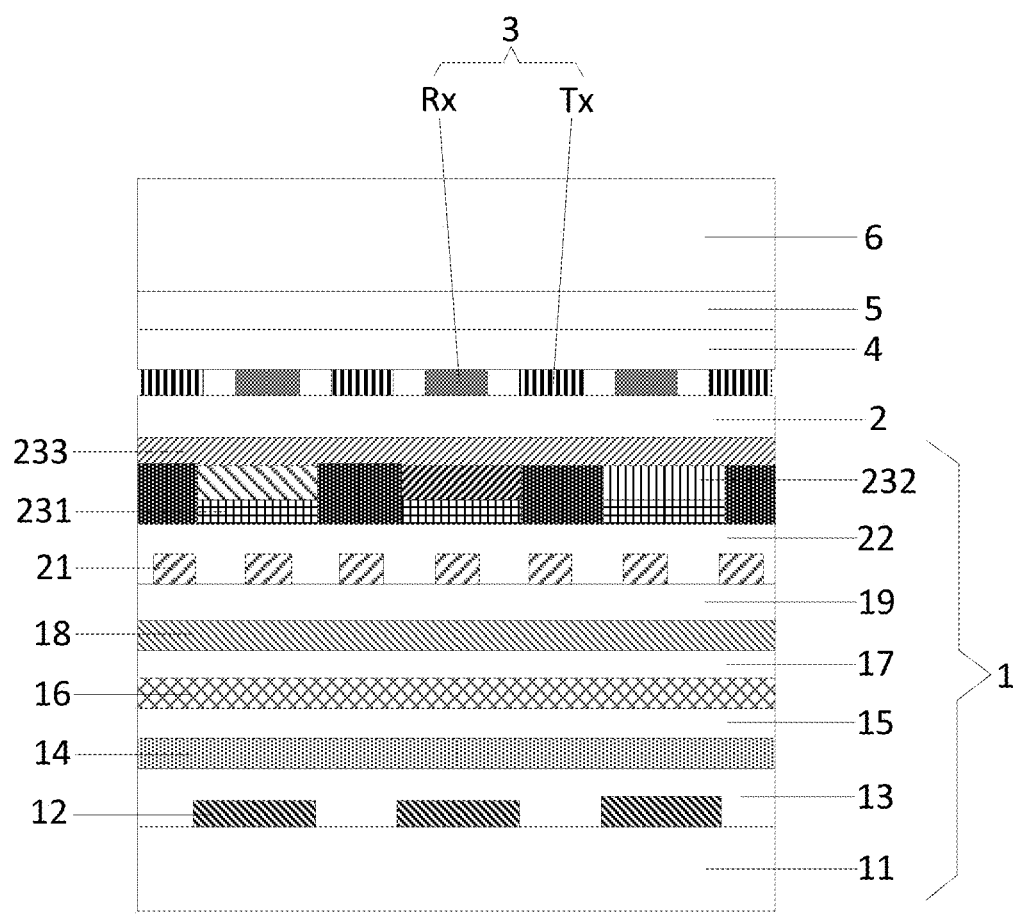
FIG. 1 is a schematic diagram of a structure of a touch screen in the related art.

To make the objects, technical solutions and advantages of the embodiments of the present disclosure more apparent, the technical solutions of the embodiments of the present disclosure will be clearly and completely described below with reference to the drawings of the embodiments of the present disclosure. It is to be understood that the described embodiments are only a few, not all of, embodiments of the present disclosure. The embodiments and features of the embodiments in the present disclosure may be combined with each other without conflict. All other embodiments, which can be derived by a person skilled in the art from the embodiments of the present disclosure without any creative effort, are within the protection scope of the present disclosure.

Unless defined otherwise, technical or scientific terms used herein shall have the ordinary meaning as understood by one of ordinary skill in the art to which the present disclosure belongs. The term "comprising", "including", or the like means that the element or item preceding the term contains the element or item listed after the term and its equivalent, but does not exclude other elements or items. The term "connected", "coupled", or the like is not limited to physical or mechanical connections, but may include electrical connections, whether direct or indirect connections. The terms "inner", "outer", "upper", "lower", and the like are used only for indicating relative positional relationships, and when the absolute position of an object being described is changed, the relative positional relationships may also be changed accordingly.

It should be noted that the sizes and shapes of various elements shown in the drawings are not necessarily drawn to scale and are merely schematic representations of the present disclosure. Like or similar elements or elements having like or similar functions are denoted by like or similar reference signs throughout the various figures.

A capacitive touch screen on the market today has a touch function with a stylus, in addition to the common touch function with a finger. The stylus may include a passive stylus or an active stylus. The active stylus has a small and exquisite pen point and has the functions such as pen pressure, suspension touch, button and the like, and thus has a wider application scene and prospect than the passive stylus. With the popularization of the active stylus, more and more touch screens, for example an electronic product with a touch screen, such as a mobile phone, a notebook computer, or a tablet computer, or the like, are equipped with the active stylus, which has higher requirements on various performances of the active stylus. Thus, the characteristics of the active stylus, including accuracy, a signal-to-noise ratio (SNR), and a hover height, need to be improved.

With the demand of a terminal customer for the product to be light, thin, folded and rollable, the conventional external hanging touch screen cannot be matched with the OLED, so the FMLOC touch technology is emerged. As shown in FIG. 1, the touch screen includes a display panel 1, an encapsulation layer 2, a touch structure 3, a polarizer 4, an optical adhesive 5 and a cover plate 6, which are sequentially stacked. That is, the touch structure 3 is directly formed on the encapsulation layer 2 on the display panel 1, and may adopt a metal mesh structure. That is, driving electrodes Tx and sensing electrodes Rx are located in the same layer, and are cooperated with a touch IC to realize the touch function.

Figure 2:
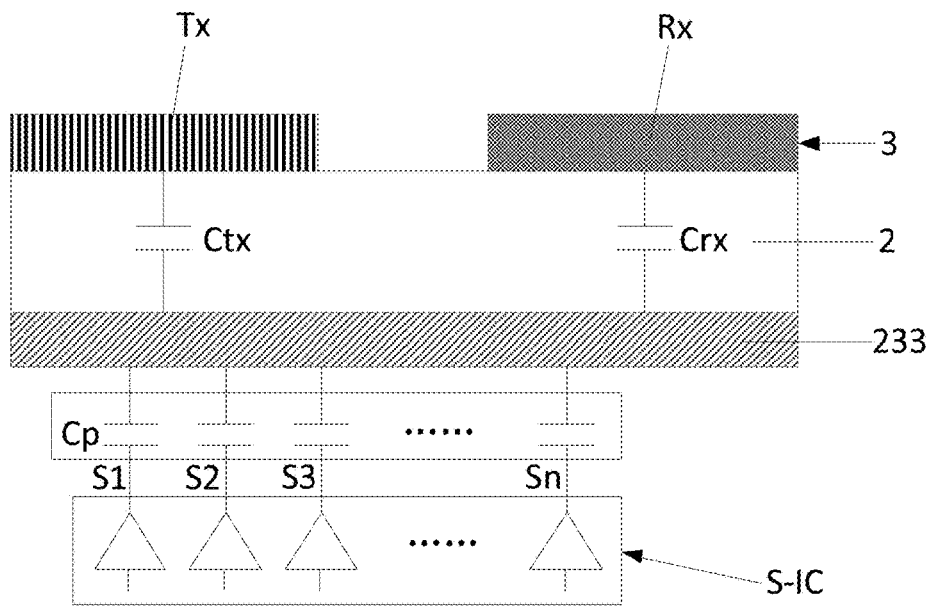
FIG. 2 is a schematic diagram of a coupling noise model corresponding to a display module shown in FIG. 1.
Figure 3:
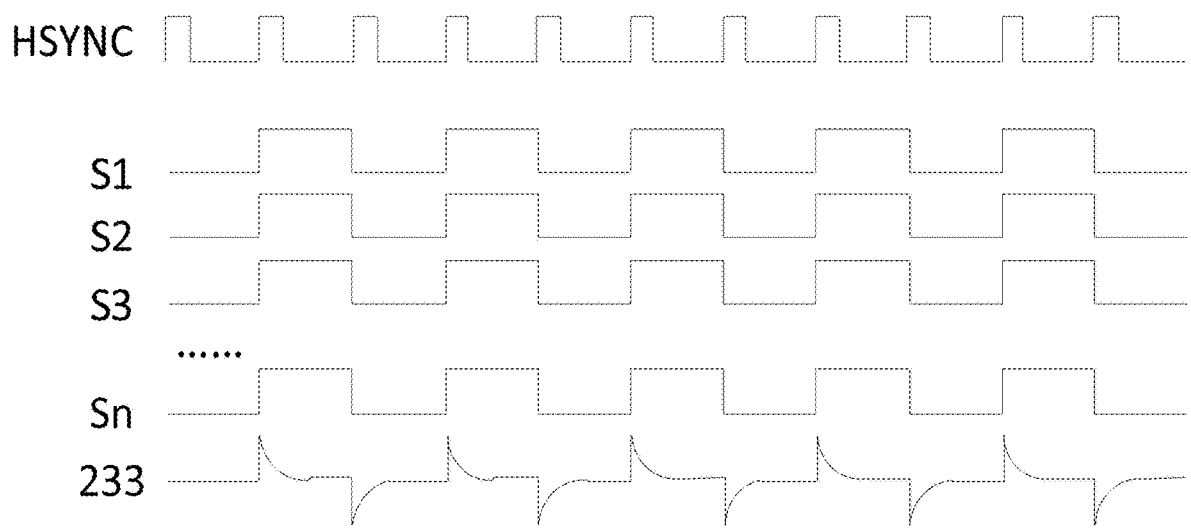
Figure 4:
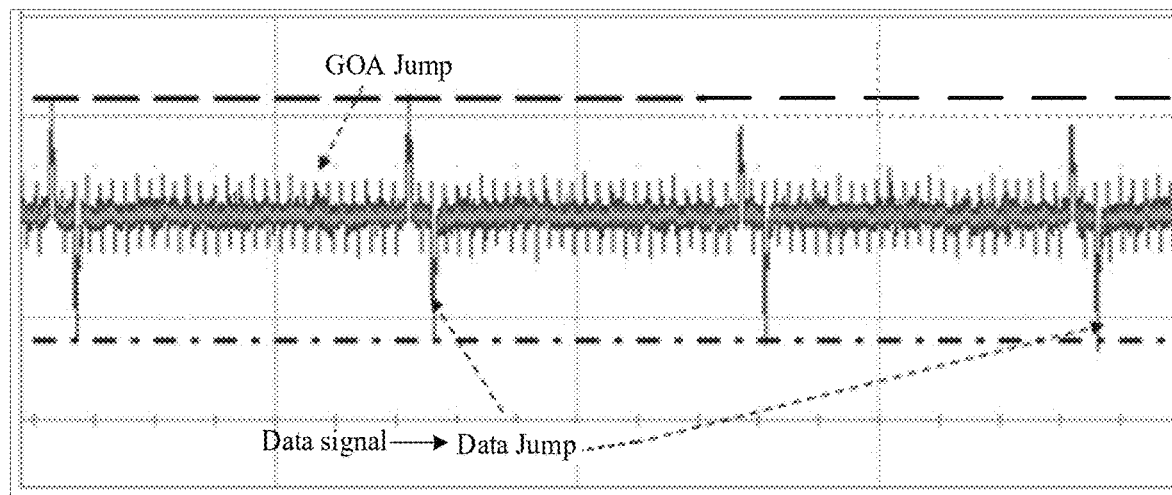
FIG. 4 is a schematic diagram showing influence of a signal jump of a data signal line on a voltage of a cathode.

As shown in FIG. 1, the display panel 1 includes a base substrate 11, an active layer 12, a gate insulating layer 13, a first gate layer 14, a first insulating layer 15, a second gate layer 16, an interlayer insulating layer 17, a first source-drain metal layer 18, a first planarization layer 19, a second source-drain metal layer 21 (provided with signal lines such as data signal lines therein), a second planarization layer 22, and a plurality of light-emitting devices, which are sequentially stacked. Each light-emitting device includes an anode 231, a luminescent layer 232, and a cathode 233, which are sequentially arranged, and the cathode 233 is closer to the encapsulation layer 2. As shown in FIG. 1, compared to the external hanging touch screen, the FMLOC touch screen is integrated on the encapsulation layer 2 on the display panel 1, Tx channels and Rx channels are closer to the cathode of the display panel 1, as shown in FIGS. 2 and 3. FIG. 2 is a schematic diagram of a coupling noise model corresponding to a display module shown in FIG. 1. A data driving chip (S-IC) is used to load the data signal lines (S1, S2, S3 . . . Sn) with data signals, a parasitic capacitor Cp exists between each of the data signal lines (S1, S2, S3 . . . Sn) and the cathode 233, and a coupling capacitor (Ctx or Crx) exists between the cathode 233 and each of the driving electrodes Tx and the sensing electrodes Rx. FIG. 3 is a schematic diagram showing signal waveforms of data signal lines (S1, S2, S3 Sn), a cathode 233 and the like. As may be seen from FIG. 3, data signal jumps (including jumps from high to low, and from low to high) may be generated during the row refresh, and data signals in the data signal lines (S1, S2, S3 . . . Sn) generate a large voltage fluctuation (ripple) at the data signal jumps, which disturbs the stability of the voltage of the cathode 233, so that the coupling noise of the cathode 233 to the driving electrodes Tx and the sensing electrodes Rx of the touch structure 3 in FIG. 2 has a large fluctuation. As shown in FIG. 4, the Data jump in FIG. 4 means that (a spike of) the coupling noise between the cathode 233 and the driving electrodes Tx and the sensing electrodes Rx is large due to the large voltage fluctuation generated at the data signal jumps. When a magnitude of the coupling noise reaches a certain degree, the SNR of the touch screen is seriously low, the touch chip (T-IC) cannot distinguish the coupling noise from the touch signal quantity, and thus the touch function cannot be realized. Especially in the aspect of the active stylus function, the active stylus point is small (about 1 mm), the coupling signal quantity between the active stylus point and the driving electrodes Tx and the sensing electrodes Rx is very small, and the active stylus has a synchronization function with the smaller signal quantity in a Hover state besides the conventional writing in a contact mode, so if the coupling noise is large, the active stylus function cannot be realized in the large-sized OLED.

Therefore, how to reduce the coupling noise between the cathode and the driving electrodes Tx and the sensing electrodes Rx caused by the data signal jumps becomes a key for solving the problem of the active stylus in the large-sized OLED.

Figure 5:
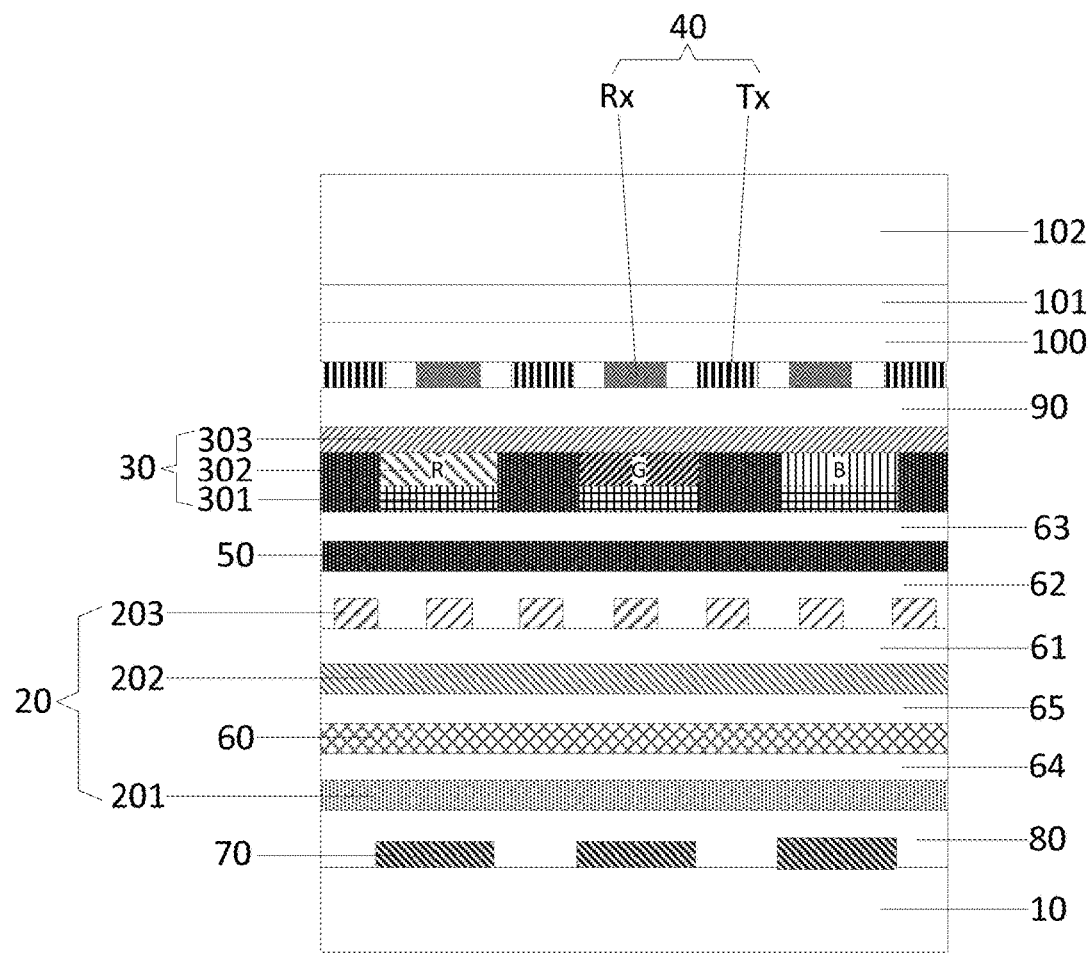
FIG. 5 is a schematic cross-sectional view of a touch display panel according to an embodiment of the present disclosure.
Figure 6:
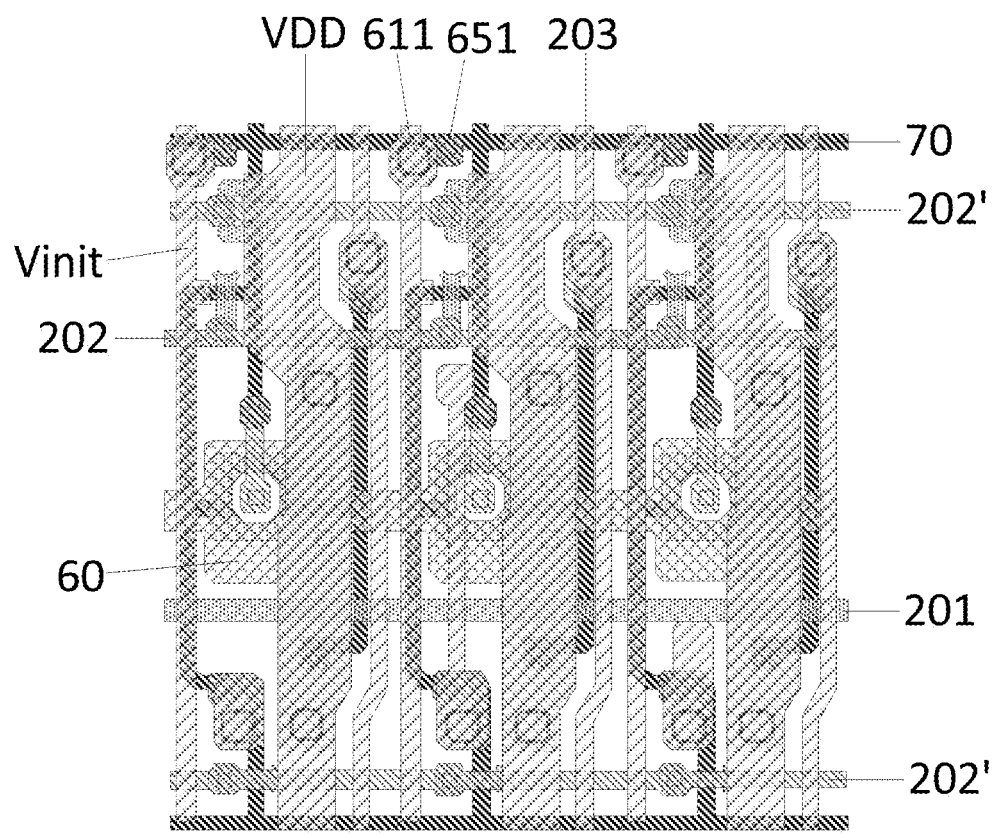
FIG. 6 is a schematic plan view of a touch display panel without a shielding layer according to an embodiment of the present disclosure.
Figure 7:
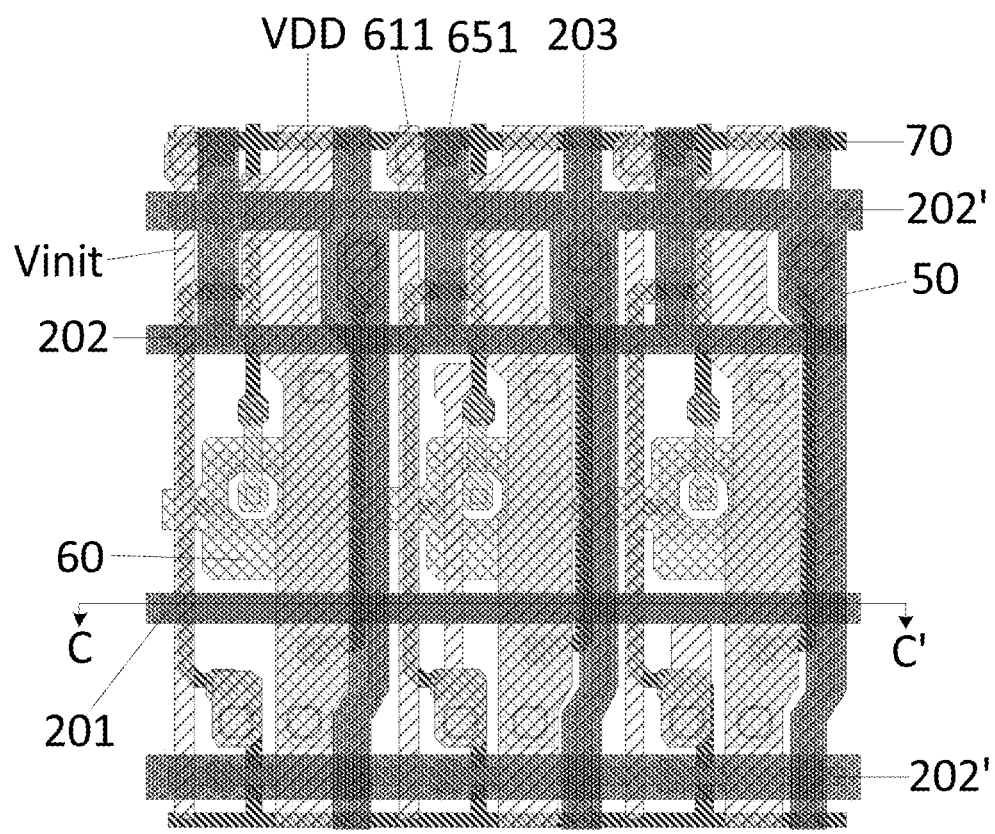
FIG. 7 is a schematic plan view of a touch display panel with a shielding layer according to an embodiment of the present disclosure.

In view of the above, in order to reduce coupling noise between the cathode and the driving electrodes Tx and the sensing electrodes Rx caused by the data signal jumps, an embodiment of the present disclosure provides a touch display panel, as shown in FIGS. 5 to 7. FIG. 5 is a schematic cross-sectional view of a touch display panel; FIG. 6 is a schematic plan view of a touch display panel without a shielding layer; FIG. 7 is a schematic plan view of a touch display panel with a shielding layer. FIG. 5 is a schematic cross-sectional view of the touch display panel along a CC' line in FIG. 7. The touch display panel includes following components:

A base substrate 10;

A plurality of display signal lines 20 disposed on one side of the base substrate 10;

A plurality of light-emitting devices 30 arranged in an array on a side of the plurality of display signal lines 20 away from the base substrate 10;

A touch structure 40 disposed on a side of the plurality of light-emitting devices 30 away from the base substrate 10;

A shielding layer 50 disposed between the plurality of display signal lines 20 and the plurality of light-emitting devices 30, wherein an orthographic projection of the shielding layer 50 on the base substrate 10 covers at least a part of an orthographic projection of the plurality of display signal lines 20 on the base substrate 10.

Optionally, as shown in FIG. 5 to FIG. 7, the display signal lines 20 may include at least one of data signal lines 203 (Data), scanning signal lines 202 (Gate), reset signal lines 202' (Reset), and light-emitting control signal lines 201 (EM), where signals loaded on these signal lines are all alternating current signals (i.e., signals jumping from high to low and from low to high). The jumping signals may cause large voltage fluctuation, so that a voltage of the cathode (which will be described below) of the light-emitting device 30 is unstable. Specifically, each data signal line 203 is configured to provide a display data signal for the touch display panel, each scanning signal line 202 is configured to provide a display driving signal for the touch display panel, each reset signal line 202' is configured to provide a reset signal for the touch display panel, and each light-emitting control signal line 201 is configured to provide a light-emitting control signal for the touch display panel.

In particular, as shown in FIG. 5, the light-emitting devices 30 may include a red (R) light-emitting device, a green (G) light-emitting device, and a blue (B) light-emitting device. Each light-emitting device 30 includes an anode 301, a luminescent layer 302, and a cathode 303, which are sequentially stacked. The anodes 301 of all the light-emitting devices 30 may be arranged independently of each other, and all the light-emitting devices 30 may share one cathode 303 (i.e., the cathode is arranged on an entire surface). The touch structure 40 may include driving electrodes Tx and sensing electrodes Rx, which are insulated from each other and arranged in a crossing manner and in the same layer.

In specific implementation, in the touch display panel provided in the embodiment of the present disclosure, as shown in FIG. 5 and FIG. 7, the shielding layer 50 may be made of a conductive material. For example, the material of the shielding layer may be, but is not limited to, Ti/Al/Ti, Cu, ITO, or the like. Alternatively, a sheet resistance of the conductive material used to form the shielding layer should be as low as possible.

In some embodiments, as shown in FIGS. 5 and 7, the shielding layer 50 may be loaded with a constant voltage signal or be grounded. When the shielding layer 50 is loaded with a constant voltage signal or is grounded, the interference of the signal jumps of the display signal lines 20 to the cathode 303 in the light-emitting devices 30 can be effectively shielded, and the stability of the voltage of the cathode 303 can be ensured, so that the coupling noise between the cathode 303 and the driving electrodes Tx and the sensing electrodes Rx in the touch structure 40 can be reduced.

According to the touch display panel provided by the embodiment of the present disclosure, the shielding layer 50 covering the display signal lines 20 is provided between the display signal lines 20 and the light-emitting devices 30, so that the interference of the signal jumps of the display signal lines 20 to the cathode 303 in the light-emitting devices 30 can be effectively shielded, and the stability of the voltage of the cathode can be ensured, so that the coupling noise between the cathode and the driving electrodes Tx and the sensing electrodes Rx can be reduced and the signal-to-noise ratio of the touch display panel is improved.

Specifically, as shown in FIG. 5 and FIG. 7, in the embodiment of the present disclosure, preferably, an orthographic projection of the shielding layer 50 on the base substrate 10 covers an orthographic projection of each of the data signal line 203, the scanning signal line 202, the reset signal line 202', and the light-emitting control signal line 201 on the base substrate 10, so that the interference of all signal lines loaded with the alternating current signals to the cathode can be effectively avoided, the stability of the voltage of the cathode can be further improved, and the coupling noise between the cathode and the driving electrodes and the sensing electrodes can be minimized.

In specific implementation, in the touch display panel provided by the embodiment of the present disclosure, as shown in FIG. 5 and FIG. 7, an orthographic projection of the plurality of display signal lines 20 (the data signal lines 203, the scanning signal lines 202, the reset signal lines 202', and the light-emitting control signal lines 201) on the base substrate 10 is located within the orthographic projection of the shielding layer 50 on the base substrate 10. Thus, the interference of the jumping signals (alternating current signals) on the data signal lines 203, the scanning signal lines 202, the reset signal lines 202', and the light-emitting control signal lines 201 to the cathode can be completely shielded by the shielding layer 50.

In specific implementation, as shown in FIGS. 5 to 7, in the touch display panel provided in the embodiment of the present disclosure, the data signal lines 203 are located between the base substrate 10 and the shielding layer 50, the scanning signal lines 202 and the reset signal lines 202' are disposed in the same layer and located between the data signal lines 203 and the base substrate 10, and the light-emitting control signal lines 201 are located between the scanning signal lines 202 and the base substrate 10. Specifically, a layer where the light-emitting control signal lines 201 are located is a first gate metal layer (Gate1), a layer where the scanning signal lines 202 and the reset signal lines 202' are located is a first source drain metal layer (SD1), and a layer where the data signal lines 203 are located is a second source drain metal layer (SD2).

In specific implementation, as shown in FIGS. 5 to 7, the touch display panel provided in the embodiment of the present disclosure further includes: a first planarization layer 61 located between the data signal lines 203 and the scanning signal lines 202, a second planarization layer 62 located between the data signal lines 203 and the shield layer 50, and a third planarization layer 63 located between the shield layer 50 and the light-emitting devices 30. A shape of the third planarization layer 63 is the same as that of the second planarization layer 62. Optionally, a material and a thickness of the third planarization layer 63 may or may not be the same as those of the second planarization layer 62.

In specific implementation, as shown in FIGS. 5 to 7, the touch display panel provided in the embodiment of the present disclosure further includes: a second gate metal layer 60 (Gate2) located between the light-emitting control signal lines 201 and the scanning signal lines 202. The second gate metal layer 60 is used for forming one plate of a storage capacitor in each pixel circuit of the display panel.

In specific implementation, as shown in FIGS. 5 to 7, the touch display panel provided in the embodiment of the present disclosure further includes: a fourth planarization layer 64 located between the light-emitting control signal lines 201 and the second gate metal layer 60, an interlayer insulating layer 65 located between the second gate metal layer 60 and the scanning signal lines 202, an active layer 70 located between the base substrate 10 and the light-emitting control signal lines 201, and a gate insulating layer 80 located between the active layer 70 and the light-emitting control signal lines 201.

In specific implementation, as shown in FIG. 5, the touch display panel provided in the embodiment of the present disclosure further includes: an encapsulation layer 90 located between the light-emitting devices 30 and the touch structure 40, a polarizer 100 located on a side of the touch structure 40 away from the base substrate 10, an optical adhesive 101 located on a side of the polarizer 100 away from the base substrate 10, and a cover plate 102 located on a side of the optical adhesive 101 away from the base substrate 10.

Specifically, the encapsulation layer 90 may include a first inorganic layer, an organic layer, and a second inorganic layer stacked together, the optical adhesive 101 may be an OCA (Optically Clear Adhesive), and the cover plate may be a glass cover plate.

In specific implementation, in the touch display panel provided in the embodiment of the present disclosure, as shown in FIG. 7, the shielding layer 50 has a mesh structure. Thus, the shielding layer 50 only covers the display signal lines 20, without affecting an aperture ratio of the touch display panel.

In specific implementation, the scanning signal lines are generally electrically connected to gate driver circuits (gate driver on array, GOAs), and each signal output terminal of each GOA is configured to input a scanning driving signal to each scanning signal line. The scanning signal lines are electrically connected to gate electrodes of thin film transistors in the display panel, so that the stability of the voltage of the cathode is further affected by the signal jumps on the gate electrodes. As shown in FIG. 4, the GOA jump refers to that the coupling noise (spike) between a cathode and the driving electrodes Tx and the sensing electrodes Rx is large due to the fluctuation of the voltage of the cathode caused by the jumping of the scanning driving signals. Therefore, in the touch display panel provided in the embodiment of the present disclosure, as shown in FIG. 7, the touch display panel further includes gate electrodes 201' disposed in the same layer as the light-emitting control signal lines 201, and the orthographic projection of the shielding layer 50 on the base substrate 10 also covers an orthographic projection of the gate electrodes 201' on the base substrate 10. Therefore, the interference of the jumping signals on the gate electrodes 201' to the cathode in the light-emitting devices 30 can be shielded by the shielding layer 50, and the stability of the voltage of the cathode can be further ensured.

Figure 8:
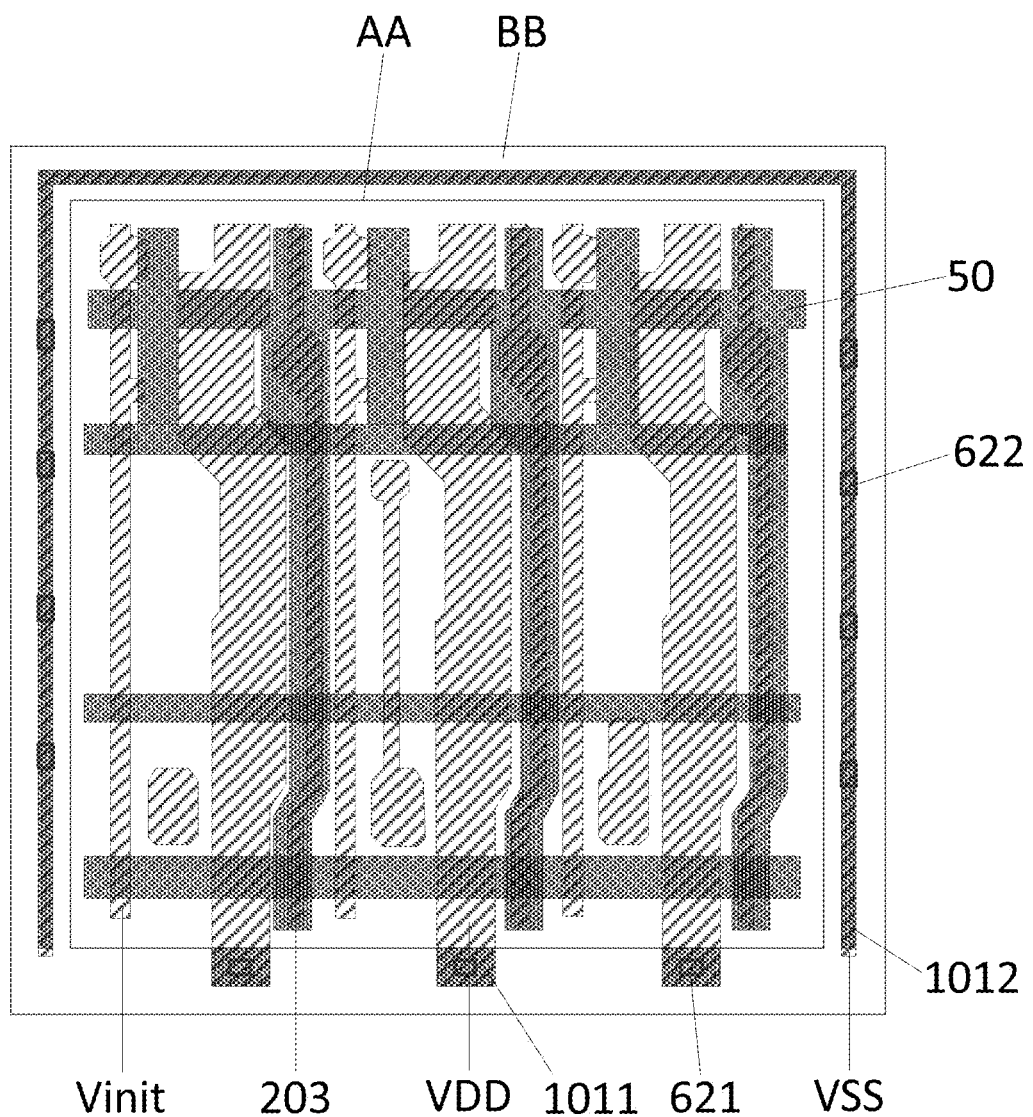
FIG. 8 is a schematic plan view of a touch display panel according to an embodiment of the present disclosure.

In a specific implementation, as shown in FIG. 8, in the touch display panel provided in the embodiment of the present disclosure, the touch display panel has a display region AA and a frame region BB disposed around the display region AA. The touch display panel further includes: a high voltage power line VDD located in the display region AA and extending to the frame region BB, and a low voltage power line VSS located in the frame region BB. The low voltage power line VSS is generally disposed around the display region AA, and the low voltage power line VSS and the high voltage power line VDD are generally disposed in the same layer as the data signal line 203. In order to reduce resistances of the low voltage power line VSS and the high voltage power line VDD, the touch display panel further includes a first conductive connection part 1011 and a second conductive connection part 1012 located in the frame region BB independent from each other and in the same layer as the shielding layer 50. The first conductive connection part 1011 may be electrically connected to the high voltage power line VDD through a first via 621 penetrating through the second planarization layer 62 (not shown), and the second conductive connection part 1012 is electrically connected to the low voltage power line VSS through a second via 622 penetrating through the second planarization layer 62. Therefore, the display uniformity of the large-sized touch display panel can be improved by reducing the resistances of the high voltage power lines VDD or the low voltage power line VSS.

It should be noted that in the embodiment of the present disclosure, FIG. 8 is only for schematically illustrating an electrical connection relationship between the first conductive connection part 1011 and the high voltage power lines VDD, and an electrical connection relationship between the second conductive connection part 1012 and the low voltage power line VSS. Patterns of the first conductive connection part 1011 electrically connected to the high voltage power lines VDD and the second conductive connection part 1012 electrically connected to the low voltage power line VSS are designed according to actual structures of the high voltage power line VDD and the low voltage power line VSS.

Figure 9A:
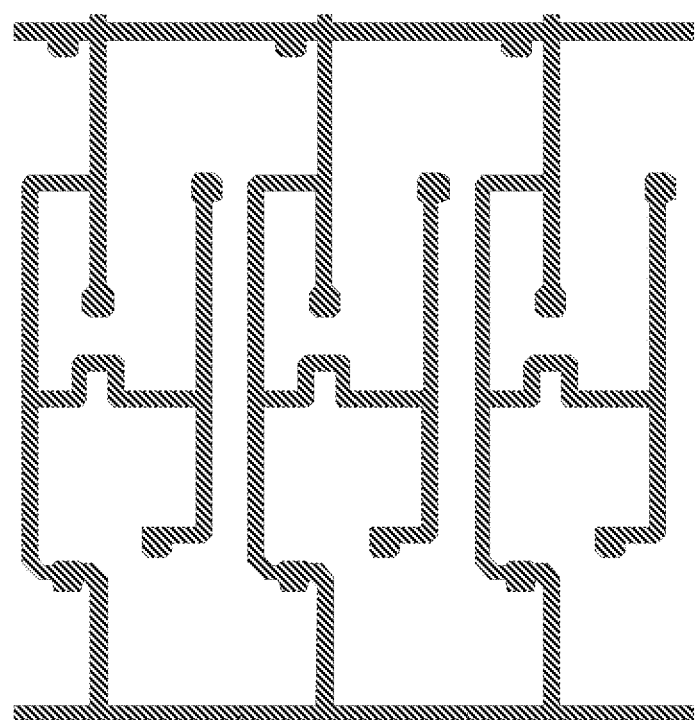
FIGS. 9A to 9H are schematic plan views of layers shown in FIG. 7.
Figure 9B:
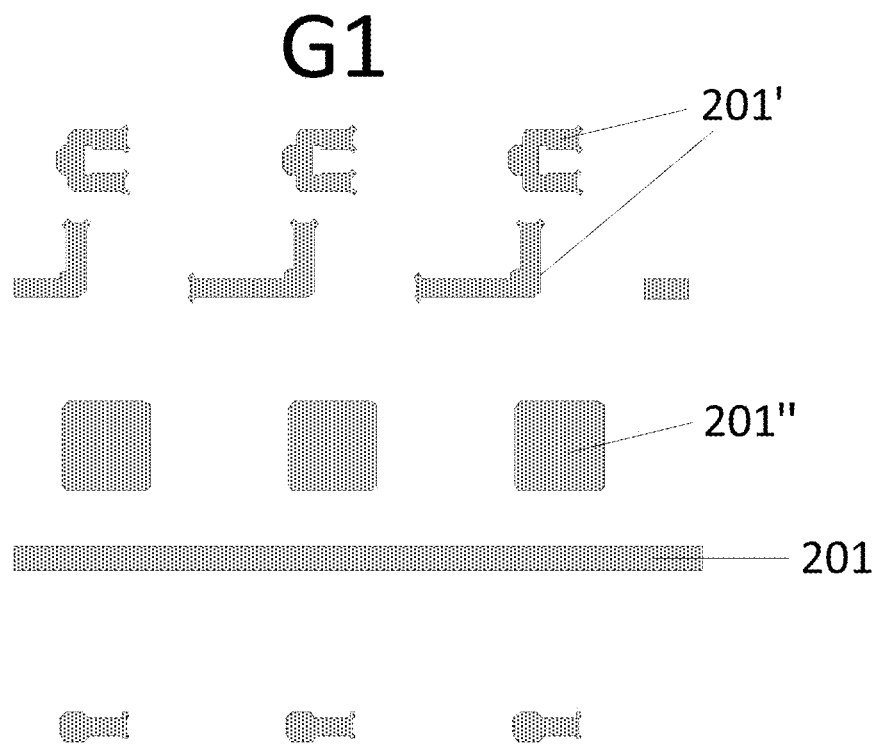
Figure 9C:
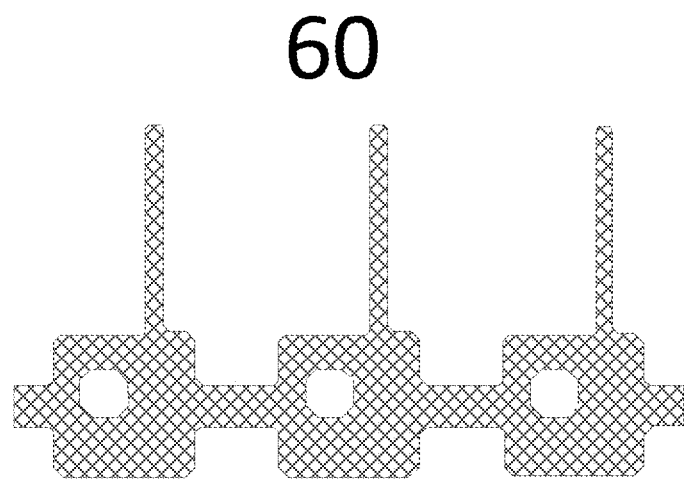
Figure 9D:
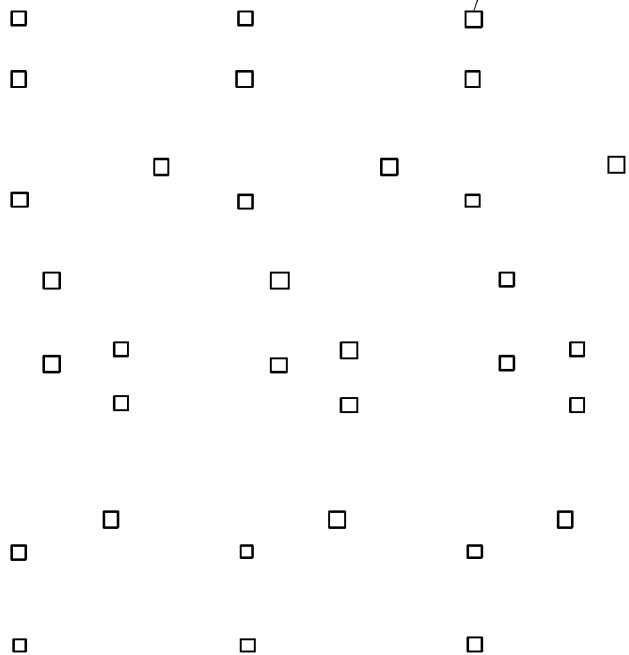
Figure 9E:
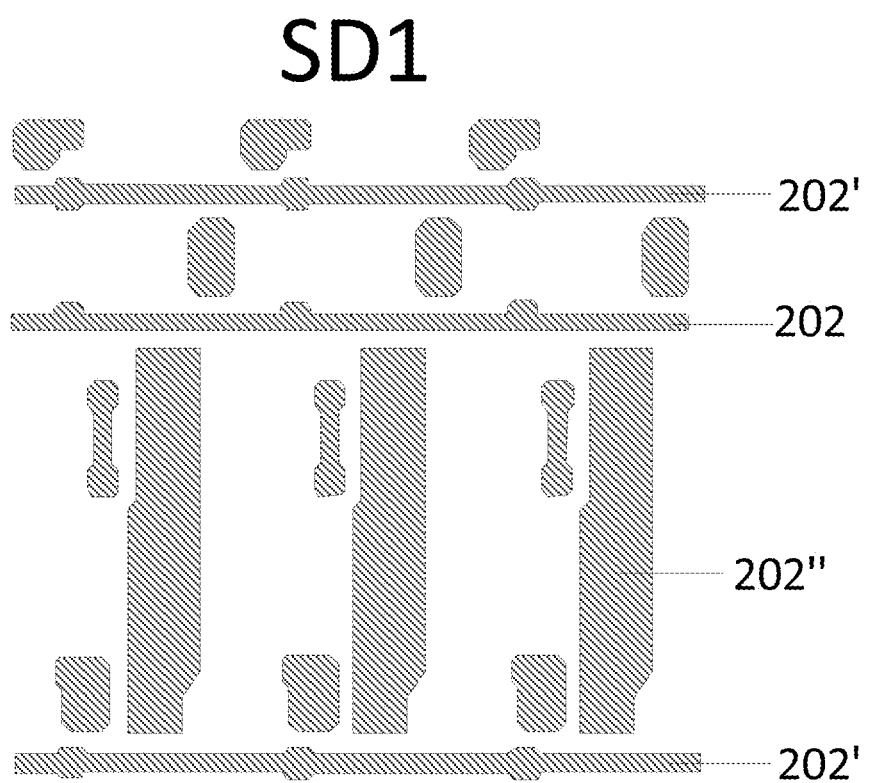
Figure 9F:
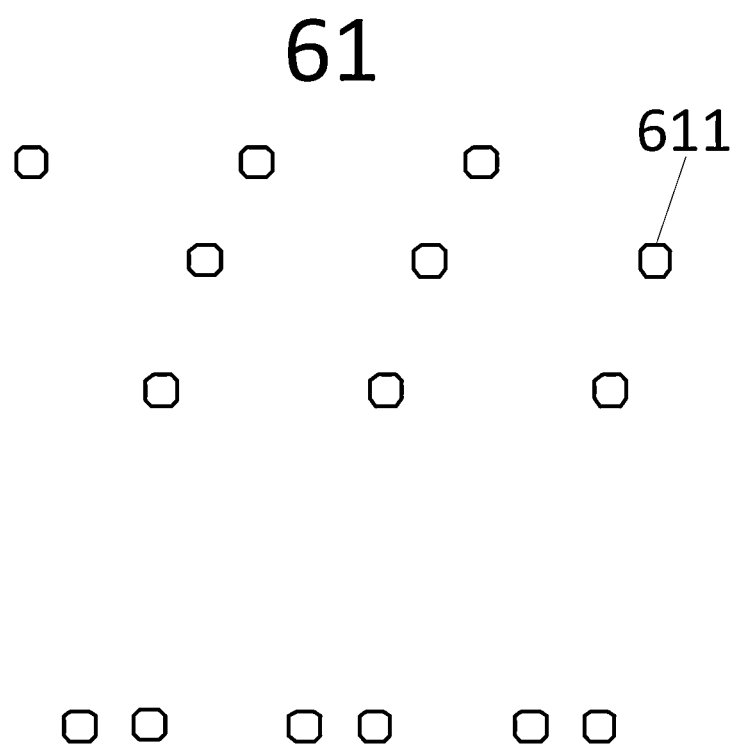
Figure 9G:
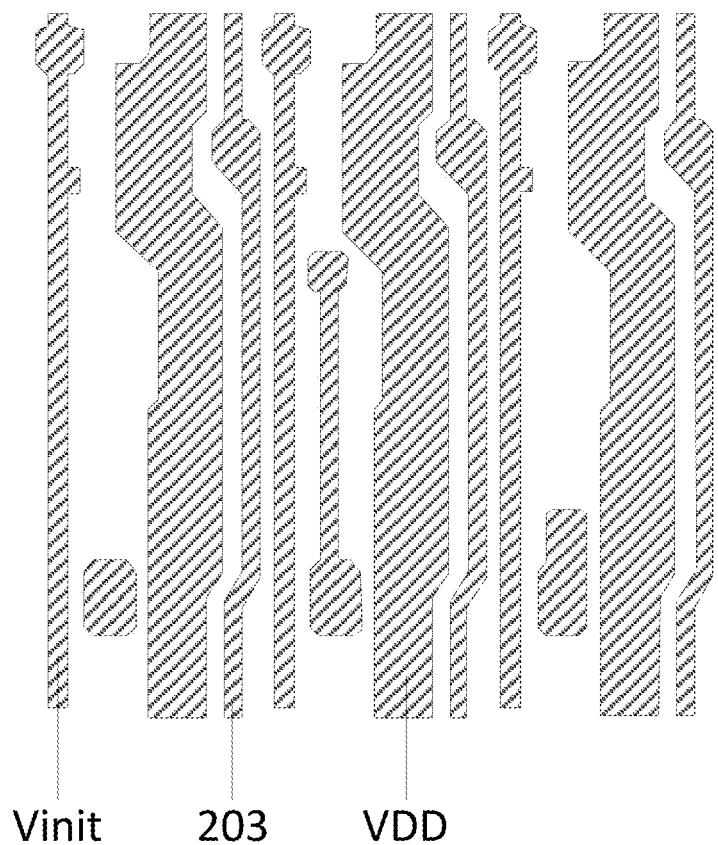
Figure 9H:
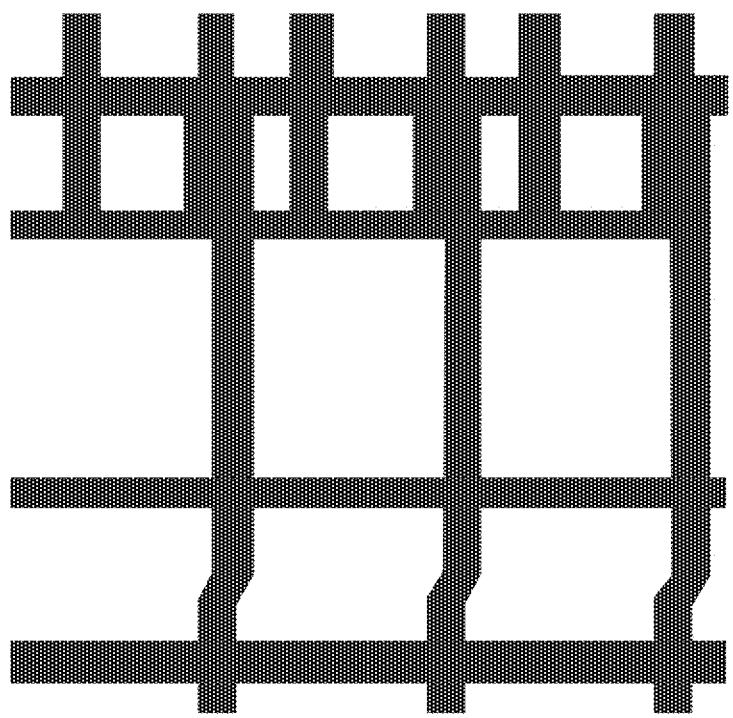

As shown in FIGS. 9A to 9H, FIGS. 9A to 9H are schematic diagrams of layout of layers in FIG. 7. FIG. 9A is a schematic plan diagram of the active layer 70. FIG. 9B is a schematic plan diagram of the first gate metal layer (Gate1). The first gate metal layer (Gate1) includes the light-emitting control signal line 201, the gate electrodes 201', and the other plate 201" of the storage capacitor in each pixel circuit of the display panel and the like. FIG. 9C is a schematic plan diagram of the second gate metal layer (Gate2). FIG. 9D is a schematic plan diagram of third vias 651 in the interlayer insulating layer 65. FIG. 9E is a schematic plan diagram of the first source drain metal layer (SD1). The first source drain metal layer (SD1) includes the scanning signal lines 202, the reset signal lines 202', and the conductive connection parts 202" electrically connected to the high voltage power lines VDD located in the second source drain metal layer (SD2) for reducing the resistances of the high voltage power lines VDD. FIG. 9F is a schematic plan view of fourth vias 611 in the first planarization layer 61. FIG. 9G is a schematic plan view of the second source drain metal layer (SD2). The second source drain metal layer (SD2) includes the data signal lines 203, the high voltage power lines VDD, initialization signal lines Vinit, and the like. FIG. 9H is a schematic plan view of the shielding layer 50.

Figure 10:
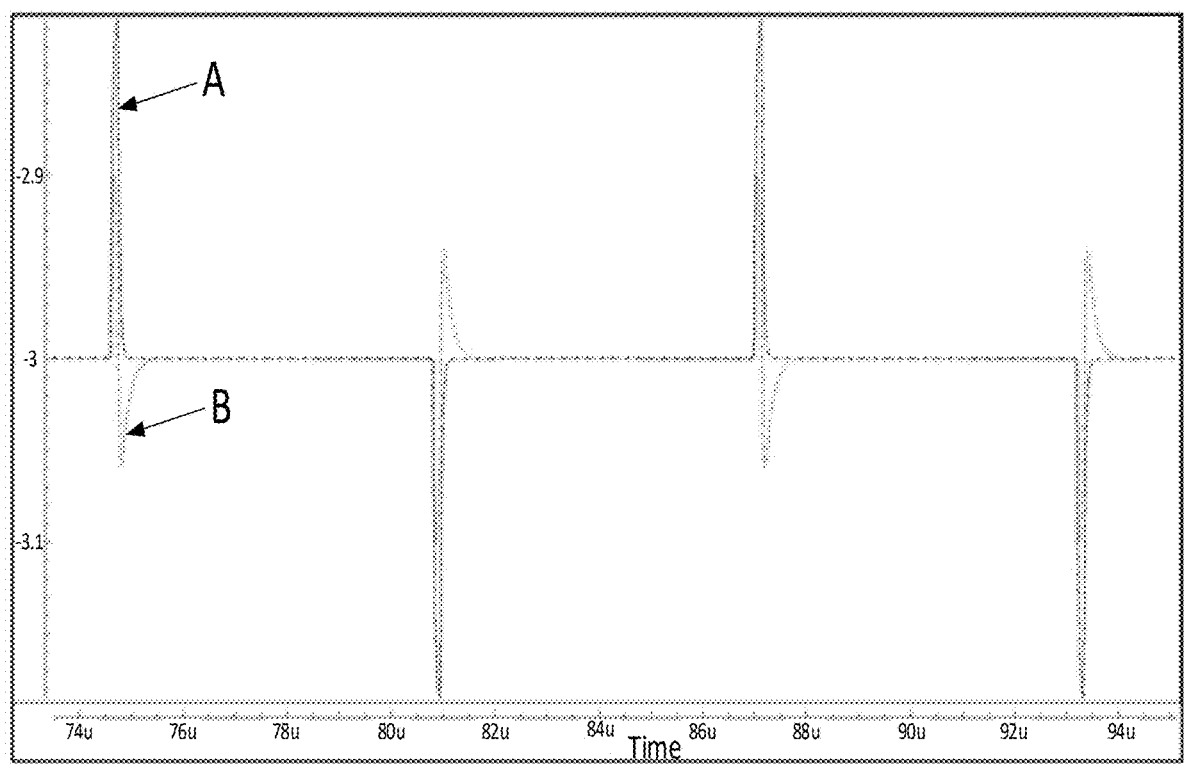
FIG. 10 is a schematic diagram illustrating simulation of coupling noise between a cathode and a touch structure in each of a touch display panel shown in FIG. 1 and a touch display panel shown in FIG. 5 according to an embodiment of the present disclosure.

As shown in FIG. 10, FIG. 10 is a simulation of coupling noise between a cathode and a touch structure in each of a touch display panel shown in FIG. 1 and a touch display panel shown in FIG. 5 according to an embodiment of the present disclosure. A curve A represents the coupling noise between the cathode and the touch structure in the touch display panel shown in FIG. 1, and a curve B represents the coupling noise between the cathode and the touch structure in the touch display panel shown in FIG. 5. It can be seen that in the embodiment of the present disclosure, as shown in FIG. 5, by providing the shielding layer 50, the fluctuation of the voltage of the cathode caused by jumping of the signals (such as Data) can be effectively shielded, 50% of the noise can be effectively reduced, the signal quantity of the touch signal can be relatively increased, the signal-to-noise ratio can be increased, and the touch performance of the touch screen with the active stylus can be improved.

Based on the same inventive concept, an embodiment of the present disclosure further provides a touch display panel, as shown in FIGS. 5 and 7, including following components.

A base substrate 10;

A plurality of display signal lines 20 disposed on one side of the base substrate 10;

A plurality of light-emitting devices 30 arranged in an array on a side of the plurality of display signal lines 20 away from the base substrate 10;

An encapsulation layer 90 disposed on a side of the plurality of light-emitting devices 30 away from the base substrate 10;

A touch structure 40 disposed on a side of the encapsulation layer 90 away from the base substrate 10;

A shielding layer 50 disposed between the plurality of display signal lines 20 and the touch structure 40, wherein an orthographic projection of the shielding layer 50 on the base substrate 10 covers at least a part of an orthographic projection of the plurality of display signal lines 20 on the base substrate 10.

The display signal lines 20 include a first signal line (201, 202, 203, 202') and a second signal line (VDD, VSS, Vinit), the first signal line (201, 202, 203, 202') is configured to input an alternating current signal, the second signal line (VDD, VSS, Vinit) is configured to input a direct current signal;

An overlapping area between the orthographic projection of the shielding layer 50 on the base substrate 10 and an orthographic projection of the first signal line (201, 202, 203, 202') on the base substrate 10 is greater than an overlapping area between the orthographic projection of the shielding layer 50 on the base substrate 10 and an orthographic projection of the second signal line (VDD, VSS, Vinit) on the base substrate 10.

According to the touch display panel provided by the embodiment of the present disclosure, the shielding layer covering at least part of the display signal lines is provided between the display signal lines and the touch structure, so that the interference of the signal jumps of the display signal lines (loaded with alternating current signals) to the cathode in the light-emitting devices can be effectively shielded, and the stability of the voltage of the cathode can be ensured, thereby reducing coupling noise between the cathode and the driving electrodes and the sensing electrodes, and improving the signal-to-noise ratio of the touch display panel.

It should be noted that in the embodiment of the present disclosure, FIG. 5 shows that the shielding layer 50 is disposed between the display signal lines 20 and the light-emitting devices 30, which is not limited thereto. For example, the shielding layer 50 is disposed between the light-emitting devices 30 and the touch structure 40, so that even if the voltage of the cathode is unstable, the driving electrodes and the sensing electrodes in the touch structure 30 are not affected.

In an implementation, in the touch display panel provided by the embodiment of the present disclosure, the first signal line may include at least one of the data signal lines 203, the scanning signal lines 202, the reset signal lines 202' and the light-emitting control signal lines 201, and the second signal line includes at least one of the high voltage power lines VDD, the low voltage power line VSS and the initialization signal line Vinit. Specifically, in the embodiment of the present disclosure, the first signal line preferably includes the data signal lines 203, the scanning signal lines 202, the reset signal lines 202', and the light-emitting control signal lines 201, so that the interference of all the display signal lines loaded with the alternating current signals to the cathode can be effectively avoided, the stability of the voltage of the cathode can be further improved, and the coupling noise between the cathode and the driving electrodes and the sensing electrodes can be minimized.

Based on the same inventive concept, the embodiment of the present disclosure further provides a display apparatus, which includes the touch display panel provided by the embodiment of the present disclosure. Since the principle of the display apparatus for solving the problems is similar to that of the touch display panel, the implementation of the display apparatus may be referred to the implementation of the touch display panel, and repeated descriptions are omitted. The display apparatus may be: any product or component with a display function, such as a mobile phone, a tablet computer, a television, a display, a notebook computer, a digital photo frame, or a navigator or the like. The implementation of the display apparatus may be referred to the embodiments of the touch display panel, and repeated descriptions are omitted.

Figure 11:
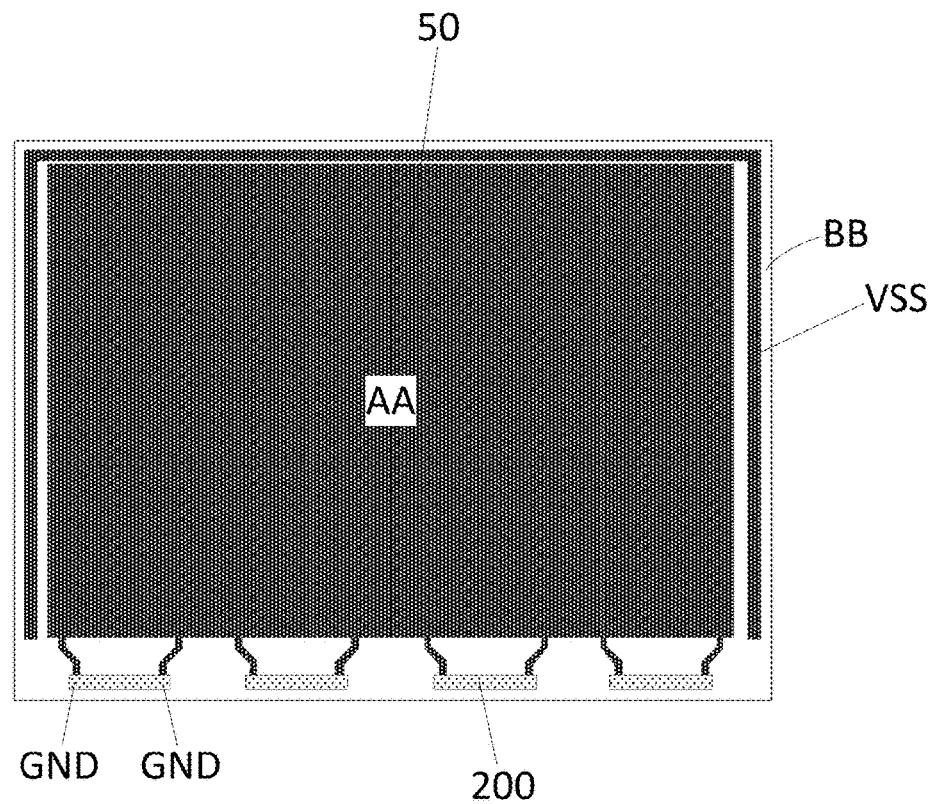
FIG. 11 is a schematic plan view of a display apparatus according to an embodiment of the present disclosure.

In specific implementation, as shown in FIG. 11, the display apparatus provided by the embodiment of the present disclosure further includes a flexible circuit board 200, the flexible circuit board 20 includes a ground pad (GND) and a constant voltage pad (not shown), and the shield layer 50 may be electrically connected to at least two ground pads (GND) or at least two constant voltage pads, or at least one ground pad (GND) and at least one constant voltage pad. In this way, the shield layer 50 may be ensured to be electrically connected to at least one other ground pad or constant voltage pad in the event that one of the ground pads or constant voltage pads fails.

In specific implementation, the display apparatus provided in the embodiment of the present disclosure further includes an active stylus. The shielding layer is disposed between the display signal lines and the light-emitting devices in the embodiment of the present disclosure, so that the voltage fluctuation caused by the signal jumps of the data signal lines and the like can be effectively shielded, the stability of the voltage of the cathode can be ensured, the coupling noise between the cathode and the driving electrodes and the sensing electrodes in the touch structure can be reduced, the signal-to-noise ratio of the touch display panel can be improved, and a major problem in the large-sized OLED display panel can be solved that the active stylus cannot implement the touch function, thereby improving the core competitiveness of the large-sized OLED display product.

The embodiment of the present disclosure provides a touch display panel and a display apparatus. The shielding layer covering the plurality of display signal lines is provided between the plurality of display signal lines and the plurality of light-emitting devices, so that the interference caused by the signal jumps of the display signal lines to the cathode in the light-emitting devices can be effectively shielded, the stability of the voltage of the cathode can be ensured, the coupling noise between the cathode and the driving electrodes and the sensing electrodes can be reduced, and the signal-to-noise ratio of the touch display panel can be improved.

While preferred embodiments of the present disclosure have been described, additional variations and modifications in these embodiments may occur to one of ordinary skill in the art once they learn of the basic inventive concepts. Therefore, it is intended that the appended claims are interpreted as including the preferred embodiments and all variations and modifications that fall within the scope of the present disclosure.

It will be apparent to one of ordinary skill in the art that various changes and modifications may be made in the embodiments of the present disclosure without departing from the spirit and scope of the present disclosure. Thus, if these modifications and variations of the embodiments of the present disclosure fall within the scope of the claims of the present disclosure and their equivalents, the present disclosure is also intended to include such modifications and variations.

What is claimed is:

1. A touch display panel, comprising:
a base substrate;
a plurality of display signal lines on one side of the base substrate;
a plurality of light-emitting devices arranged in an array on a side of the plurality of display signal lines away from the base substrate;
a touch structure on a side of the plurality of light-emitting devices away from the base substrate; and
a shielding layer between the plurality of display signal lines and the plurality of light-emitting devices, wherein an orthographic projection of the shielding layer on the base substrate covers at least a part of an orthographic projection of the plurality of display signal lines on the base substrate;
wherein the touch display panel comprises a display region and a frame region around the display region; the touch display panel further comprises: a high voltage power line in the display region and extending to the frame region, and a low voltage power line in the frame region; and
the touch display panel further comprises a first conductive connection part and a second conductive connection part arranged independent from each other in the frame region and in a same layer as the shielding layer; the first conductive connection part is electrically connected to the high voltage power line, and the second conductive connection part is electrically connected to the low voltage power line.

2. The touch display panel of claim 1, wherein an orthographic projection of the plurality of display signal lines on the base substrate is within the orthographic projection of the shielding layer on the base substrate.

3. The touch display panel of claim 1, wherein the shielding layer is made of a conductive material, and is loaded with a constant voltage signal or is grounded.

4. The touch display panel of claim 3, wherein the shielding layer is made of Titanium/Aluminum/Titanium, Copper or Indium Tin Oxide.

5. The touch display panel of claim 1, wherein the shielding layer has a mesh structure.

6. The touch display panel of claim 1, wherein the plurality of display signal lines comprise a data signal line, a scanning signal line, a reset signal line, and a light-emitting control signal line.

7. The touch display panel of claim 6, further comprising a gate electrode in a same layer as the light-emitting control signal line,
wherein the orthographic projection of the shielding layer on the base substrate further covers an orthographic projection of the gate electrode on the base substrate.

8. The touch display panel of claim 6, wherein the data signal line is between the base substrate and the shielding layer, the scanning signal line and the reset signal line are in a same layer and located between the data signal line and the base substrate, and the light-emitting control signal line is between the scanning signal line and the base substrate.

9. The touch display panel of claim 8, further comprising: a first planarization layer between the data signal line and the scanning signal line, a second planarization layer between the data signal line and the shielding layer, and a third planarization layer between the shielding layer and the plurality of light-emitting devices.

10. The touch display panel of claim 9, further comprising: an encapsulation layer between the plurality of light-emitting devices and the touch structure, a polarizer on a side of the touch structure away from the base substrate, an optical adhesive on a side of the polarizer away from the base substrate, and a cover plate on a side of the optical adhesive away from the base substrate.

11. A display apparatus, comprising the touch display panel of claim 1.

12. The display apparatus of claim 11, further comprising a flexible circuit board, wherein the flexible circuit board comprises at least one ground pad and at least one constant voltage pad, and the shield layer is at least electrically connected to two ground pads, or two constant voltage pads, or one ground pad and one constant voltage pad.

13. A touch display panel, comprising:
- a base substrate;
- a plurality of display signal lines on one side of the base substrate;
- a plurality of light-emitting devices arranged in an array on a side of the plurality of display signal lines away from the base substrate;
- an encapsulation layer on a side of the plurality of light-emitting devices away from the base substrate;
- a touch structure on a side of the encapsulation layer away from the base substrate; and
- a shielding layer between the plurality of display signal lines and the touch structure, wherein an orthographic projection of the shielding layer on the base substrate covers at least a part of an orthographic projection of the plurality of display signal lines on the base substrate; wherein the plurality of display signal lines comprise a first signal line and a second signal line, the first signal line is configured to input an alternating current signal, and the second signal line is configured to input a direct current signal; and an overlapping area between the orthographic projection of the shielding layer on the base substrate and an orthographic projection of the first signal line on the base substrate is greater than an overlapping area between the orthographic projection of the shielding layer on the base substrate and an orthographic projection of the second signal line on the base substrate.

14. The touch display panel of claim 13, wherein the first signal line comprises at least one of a data signal line, a scanning signal line, a reset signal line, and a light-emitting control signal line, and the second signal line comprises at least one of a high voltage power line, a low voltage power line, and an initialization signal line.

15. The display apparatus of claim 11, further comprising an active stylus.

16. A display apparatus, comprising the touch display panel of claim 13.

* * * * *